United States Patent
Lukic

(10) Patent No.: US 7,594,987 B2
(45) Date of Patent: Sep. 29, 2009

(54) METHOD AND DEVICE FOR ELECTROEROSIVE MATERIAL MACHINING OF A WORKPIECE

(75) Inventor: Boris Lukic, Ellwangen (DE)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 10/495,337

(22) PCT Filed: Nov. 12, 2002

(86) PCT No.: PCT/DE02/04198

§ 371 (c)(1),
(2), (4) Date: Sep. 24, 2004

(87) PCT Pub. No.: WO03/041900

PCT Pub. Date: May 22, 2003

(65) Prior Publication Data

US 2005/0061682 A1   Mar. 24, 2005

(30) Foreign Application Priority Data

Nov. 13, 2001   (DE) ................. 101 55 607

(51) Int. Cl.
*B23H 7/18*   (2006.01)
*B23H 7/26*   (2006.01)
*B23H 7/28*   (2006.01)
*B23H 7/32*   (2006.01)

(52) U.S. Cl. ............... 205/641; 205/649; 205/652; 204/224 M; 204/230.2; 204/230.3

(58) Field of Classification Search ............. 219/69.15; 205/641, 649, 652; 204/224 M, 230.2, 230.3, 204/230.4

See application file for complete search history.

(56) References Cited

U.S. PATENT DOCUMENTS

| | | | | |
|---|---|---|---|---|
| 3,586,198 A | * | 6/1971 | Hockenberry | 219/69.13 |
| 4,430,180 A | * | 2/1984 | Shimizu | 205/649 |
| 4,436,976 A | * | 3/1984 | Inoue | 219/69.2 |
| 4,471,197 A | * | 9/1984 | Inoue | 219/69.17 |
| 4,504,721 A | * | 3/1985 | Inoue | 219/69.17 |
| 5,159,167 A | | 10/1992 | Chaikin et al. | 219/69.15 |
| 5,166,489 A | * | 11/1992 | Huff et al. | 219/69.12 |
| 6,225,589 B1 | | 5/2001 | Bartok | 219/69.16 |

FOREIGN PATENT DOCUMENTS

DE   2 203 773   9/1973

* cited by examiner

*Primary Examiner*—Bruce F Bell
(74) *Attorney, Agent, or Firm*—Ronald E. Greigg

(57) ABSTRACT

A method and an apparatus for electroerosive material machining of a workpiece with an elongated tool electrode are described. The tool electrode is guided in an electrode guide, in which an oval void is embodied. The wire segment located in the void is exposed to a magnetic field, as a result of which the wire segment can be deflected laterally. The lateral deflection is converted into an axial motion of the wire segment located in the region of the workpiece, in order to create an optimal work gap between the workpiece and the free end part of the wire segment.

11 Claims, 2 Drawing Sheets

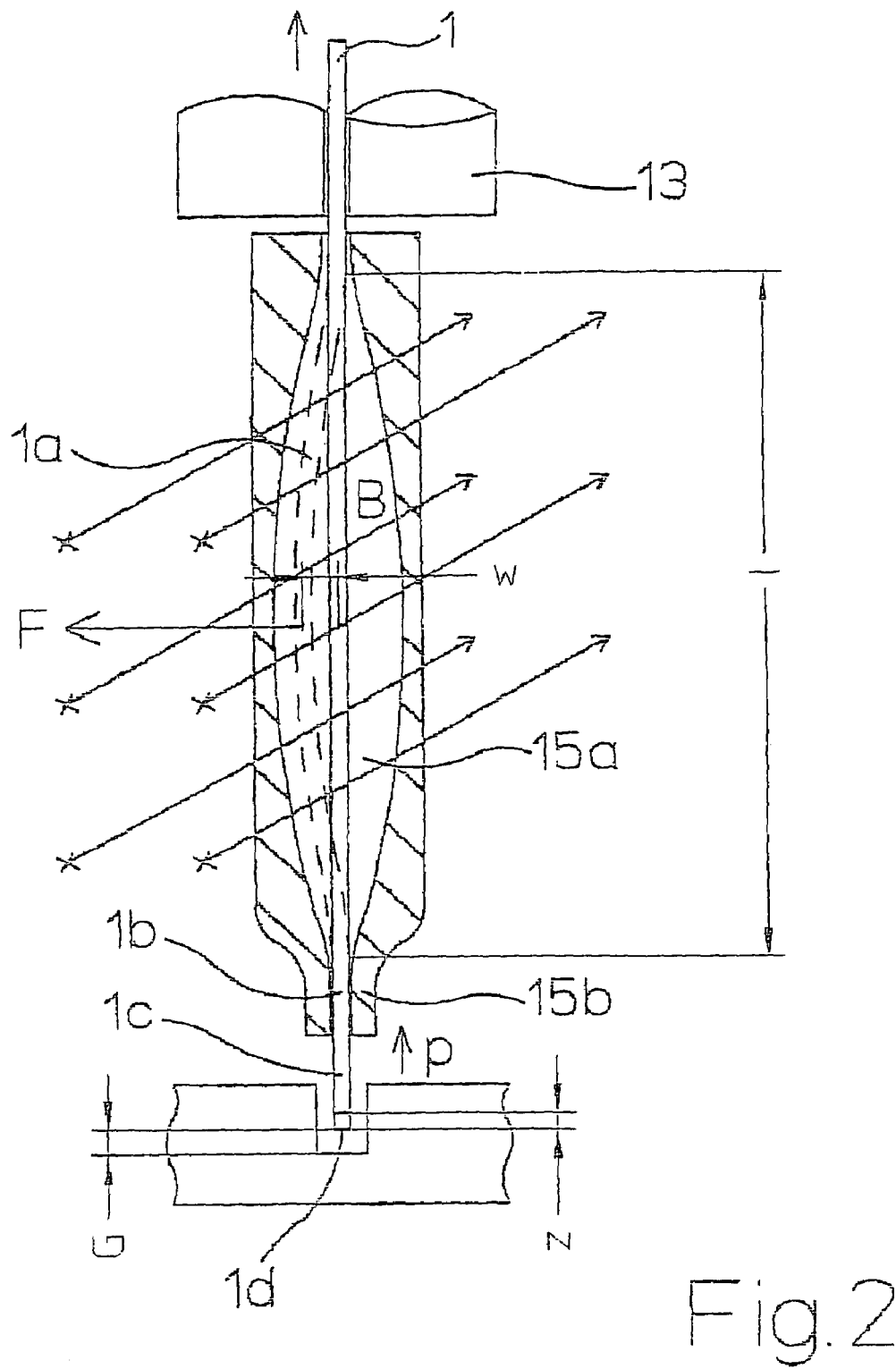

METHOD AND DEVICE FOR ELECTROEROSIVE MATERIAL MACHINING OF A WORKPIECE

CROSS-REFERENCE TO RELATED APPLICATIONS

This application is a 35 USC 371 application of PCT/DE 02/04198 filed on Nov. 12, 2002.

BACKGROUND OF THE INVENTION

1. Field of the Invention

The invention relates to an improved method of and an apparatus for electroerosive material machining of a workpiece with an elongated tool electrode.

2. Description of the Prior Art

In electroerosive material machining (this term here refers to a machining method that provides for the removal of material from a conductive workpiece, at least in part by the action of electrical discharges), a tool electrode is placed spaced apart from and opposite a workpiece across a work gap. The work gap is flushed with a work fluid, and an erosive machining current, conventionally in the form of a train of electrical pulses, flows between the tool electrode and the workpiece. Successive electrical discharges are thus generated through the fluid-flushed work gap, in order to remove material from the workpiece. Depending on the progress of the removal of material, the tool electrode held by a tool head is advanced by a control system, in order to keep the work gap, which would otherwise increase in size, essentially constant.

In the erosion process, an erosive wear of the machining face of the tool electrode can occur. Moreover, after every discharge, a change in the conditions in the work gap occurs, caused by a change in the properties of the dielectric, such as soiling, temperature and so forth, which for instance change the electrical conductivity. Not only the electrical parameters but the erosion process is affected by the flushing. In bores with a large aspect ratio, it often happens that the removal process fails, since the products of removal can no longer be removed from the gap. As a consequence, besides normal spark discharges, so-called degenerations occur, which markedly affect the removal and wear. Idle pulses (the work gap is too large), faulty discharges (the work gap is too small), and short-circuit pulses (the work gap equals zero), in particular, come under the category of degeneration.

If a good erosion process is to be assured, ideal discharge conditions in the work gap must be created, which as much as possible preclude the occurrence of short circuits, faulty discharges and idle pulses. The essential criterion here is for interference variables to be detected by means of suitable process parameters for assessing the instantaneous status of the process. Various strategies, which may include various target functions, then lead to suitable tracking of the controlling variables in the machine.

U.S. Pat. No. 4,771,157, discloses a process in which the erosion process is monitored by a short-circuit detector, and in accordance with the input data, the tool electrode is moved in the axial motion via a control system, to make it possible to keep the work gap essentially constant.

Recently, the use of fuzzy logic, by means of the formulation of automatic control mechanisms, makes it possible to combine various parameters into a multi-variable automatic control system. Thus the machine parameters are even better-adapted to the current state of the process and lead to the desired outcome of the work.

However, it is very important that a control system put the tool electrode into the desired position quickly and accurately in accordance with the process state. Faster and faster and above all more and more expensive control systems are therefore used. To reduce the inertia of the control system, the attempt is made to reduce the mass of the moving part of the control system still further. For this purpose, some apparatuses have two control systems: one control system that puts the tool electrode coarsely in the vicinity of the workpiece, and the more-accurate and above all faster control system which as the process continues determines the fine setting of the work gap. A further problem is so-called microspark erosion, in which the tool electrode is very thin and has a diameter between 20 µm and 200 µm. Until now, for microscopic bores smaller than 0.1 mm and an aspect ratio between the diameter and depth of 1:10, microspark erosion has not established itself in large-scale mass production. However, with such dimensions, electrode manipulation also proves to be problematic.

The object of the invention is to refine a method and an apparatus of the type defined at the outset, by which a direct, fast and simple control system for regulating the work gap is to be created, and the tool electrode itself is an active component of the control system. A further object of the invention is simple electrode manipulation; that is, picking up, aligning and chucking of the tool electrode for continuous machining of the workpiece to form a desired opening should be designed such that usage in large-scale mass production is made possible. The term "opening" here means in particular, but not exclusively, so-called microscopic bores in which the electrode diameter is between 20 µm and 200 µm.

SUMMARY OF THE INVENTION

In comparison to the known apparatuses, the electroerosive machining apparatus of the invention has the advantage that because of the lateral deflection of the tool electrode, an axial motion of the free end part is brought about, thus creating fast, accurate fine regulation of the work gap. An advantageous embodiment is based on the physical principle that a conductor through which current flows is deflected in a magnetic field. To this end, part of the tool electrode is exposed to the action of a magnetic field. The tool electrode can take the form of a continuous, elongated tool, such as that of a wire that is held by the tool head. The part of the wire protruding out of the tool head has a certain length, which makes it possible for the wire electrode, which is located in the magnetic field, to be elastic deformed, since during the erosion process, erosive machining current flows through the wire electrode, creating a deflection force transversely to the electrode axis. This deflection force can bring about an elastic deflection motion of the wire electrode, which is converted in the electrode guide into an axial motion of the free end part.

It is highly advantageous that precisely the tool electrode itself is the moving part of an electromagnetic converter, and as a result the embodiment of the converter is greatly simplified and the positioning accuracy is increased, since transmission elements are no longer necessary. The positioning speed is also increased, since the mass of the moving part is reduced to a minimum. It is furthermore highly advantageous that the axial motion of the tool electrode corresponds directly to the erosive machining current intensity, which is determined essentially by the work gap, so that a direct proportional regulation of the work gap as a function of the erosive machining current is also created.

The electrode guide has an oval void, which allows a deflection of the wire electrode but at the same time limits it, and the sliding passage, in which the lateral deflection motion of the wire electrode, which arises in the oval void, is converted into an axial motion of the free end part. The poles of a magnet source, which generate a homogeneous magnetic field in the void, are accommodated laterally of the electrode guide. Between the electrode guide and the workpiece, there is a gap, whose width is only great enough that the machining fluid can adequately flush out the machining gap. In this way, the protruding free end part of the wire electrode is brought appropriately to the workpiece.

Electrode feed drive devices have the task of tracking the wire electrode, as a function of the removal of material and wear, in such a way that only it can be supplied with current. Optimizing the work gap then proceeds very quickly and accurately by deflection of the wire electrode. Electrode feed drive devices are therefore designed for only coarse, slow events and can be manufactured relatively simply and economically. Threading the wire electrode into the guide is done automatically by means of the electrode feed drive devices, and the wire electrode is stored in reserve on a coil in the tool head.

If the length of the wire in the magnetic field and the field intensity of the external magnetic field are kept constant, then the deflection force is proportionally dependent on the erosive machining current, which in turn is dependent on the work gap, thus resulting in a proportional controller without additional expense. Other automatic control systems can also be employed if with the aid of an electromagnet an external magnetic field is generated whose field intensity is regulated by an erosion processor.

The wire electrode can be rotated during the machining process for the sake of better flushing, especially in the case of relatively deep bores, and also for the sake of compensating for friction between the sliding passage and the wire electrode.

BRIEF DESCRIPTION OF THE DRAWINGS

The invention is described in detail herein below, in conjunction with the drawings, in which:

FIG. 2 is an enlarged schematic view of the electrode guide of the apparatus of FIG. 1.

DESCRIPTION OF THE PREFERRED EMBODIMENT

Figure 1:
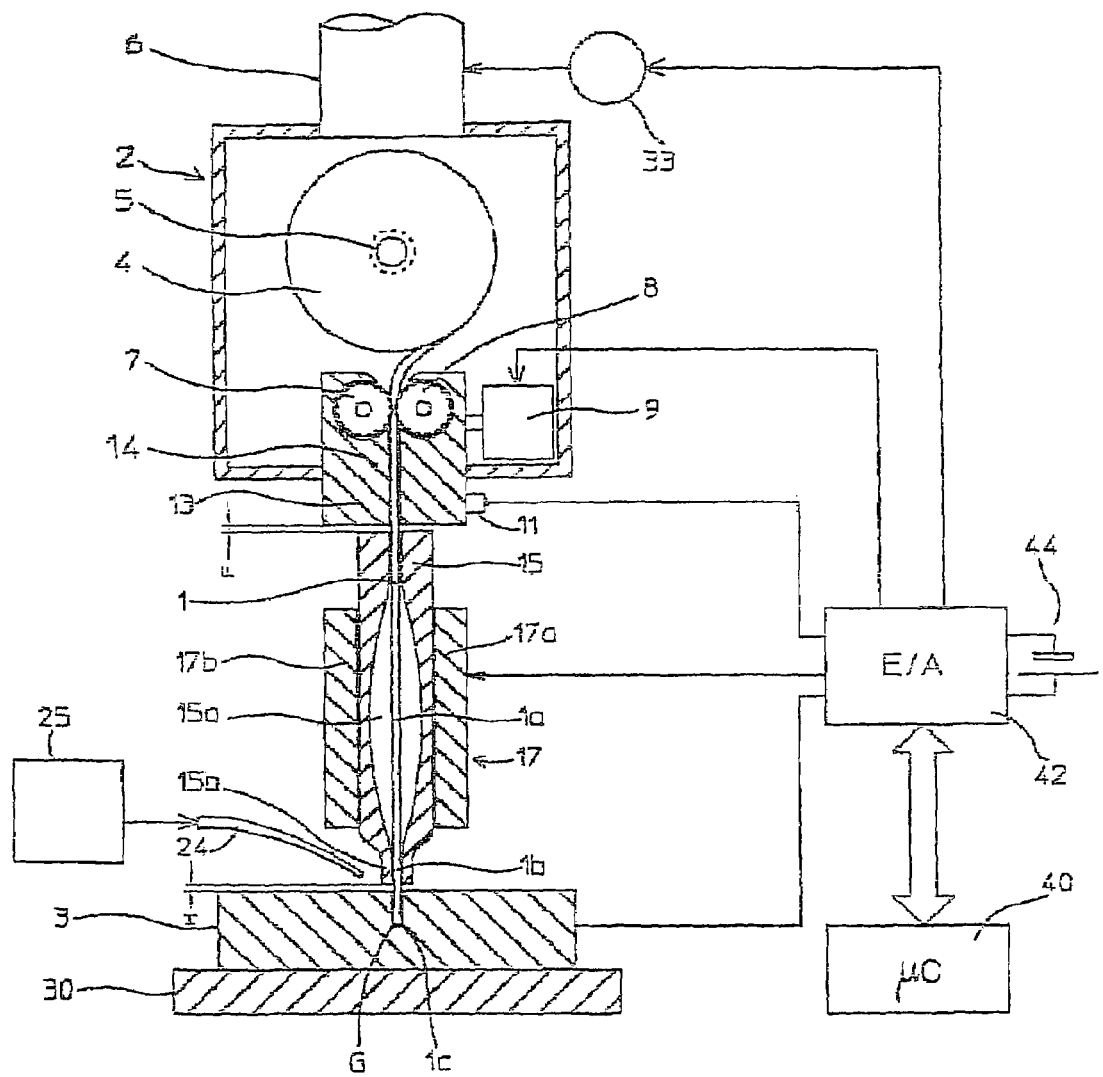
FIG. 1 is a schematic view, partly in a sectional view and partly as a circuit diagram, for illustrating an electroerosive machining apparatus using a continuous wire electrode by applying the invention.

FIG. 1, the apparatus shown uses a tool electrode in the form of a continuous wire, for instance of copper, with a thickness of 0.02 mm to 0.2 mm. As shown, the wire electrode 1 extends within an electrode guide 15 in a tool head 2 in such a way that it has a free end part 1c, which protrudes from the electrode guide 15 and ends at the machining electrode face 1d, which is opposite a workpiece 3 at a distance G, with which as shown a hole is machined. The tool head 2 is secured to a spindle 6, which optionally also serves to rotate the tool head 2. The continuous wire electrode is stored on a coil 4, which is held rotatably in the tool head 2 by means of a pin 5. Also located in the tool head 2 is a bush 13, in which the electrode feeding devices are accommodated. The bush 13 contains a slaving roller 8 and a squeezing roller 7, between which the wire electrode 1 is held, and also contains a drive motor 9 for rotating the slaving roller 8 via a gear mechanism, not shown, for the axial motion of the wire electrode 1 guided by the coil 4. The bush 13 furthermore includes a bore 14, in which the wire electrode is guided and held by positive engagement in a feeding motion. Between the tool head 2 and the electrode guide 15, an air gap μ is provided, to enable the relative motion between the bush 13 and the electrode guide 15.

Laterally of the electrode guide 15, the poles 17a and 17b of a magnet 17 are accommodated; they preferably originate in an electromagnet and they generate a homogeneous magnetic field 18 in an oval void 15a of the electrode guide 15. The guide 15 is preferably made from nonmagnetic, electrically conductive material. Between the electrode guide 15 and the workpiece 3, there is a gap I, so that the machining fluid can adequately flush out the machining gap G.

An input/output module, identified in general by reference numeral 42, is provided and serves as a control unit for a spindle motor 33, an electrode feeding motor 9, and the electromagnet 17. The wire electrode 1 is also not only connected to a direct current source 44 via the input/output module 42 and a contact 11 but also switched on and off thereby, in order to generate a train of electrical discharges between the machining face 1d in the free end part 1c of the wire electrode 1 and the workpiece 3, through the work gap G that is flushed with a work fluid. The work fluid can be introduced into the work gap G by one or more nozzles 24 that communicate with a source 25 of fluid. The workpiece 3 is fixedly mounted on a workpiece table 30. A process computer 40 is connected to the input/output module 42 and processes process-determining setting variables.

The principle of operation will now be illustrated in conjunction with the sketch shown in FIG. 2: The wire electrode 1, which extends out of the bush 13, has a deflecting part 1a in the oval void 15a; a guided part 1b in the sliding passage 15b; and a free end part 1c, which protrudes from the electrode guide 15 and ends at the machining face 1d. The middle deflecting part 1a has a length I and is located in the magnetic field B and is supplied with the erosive machining current I. As the process continues, a force F that is transverse to the electrode axis acts on the deflecting part 1a and seeks to deflect the deflecting part 1a in the direction of the arrow representing force F. The deflection force F can be calculated as follows:

$$F = B * I * I,$$

in which

B=magnetic flux density I=erosive machining current I=length of the wire electrode located in the magnetic field.

If the force F is great enough, for instance because the work gap G is too small and the erosive machining current I has therefore risen, the deflecting part 1a is deflected out of the axis by the amount w. In the sliding passage 15b, this motion transverse to the electrode axis is converted by a stepup into an axial motion in the direction of the arrow P, and as a result the work gap G is enlarged by the amount Z, so that on the other side the wire electrode 1 is firmly held in the tool head 2 by the slaving roller 8 and the squeezing roller 7. As soon as the work gap G has increased in size, the erosive machining current I drops, as does the deflection force F, as a result of which the deflecting part 1a, because of the elastic forces of the wire electrode 1, straightens out again, and the work gap G becomes smaller again. This process is repeated until compensation of the forces occurs.

The foregoing relates to preferred exemplary embodiments of the invention, it being understood that other variants and embodiments thereof are possible within the spirit and scope of the invention, the latter being defined by the appended claims.

The invention claimed is:

1. A method for electroerosive material machining of a workpiece with an elongated tool electrode, comprising the steps of:
   holding the tool electrode in a tool head by an electrode feed drive device in such a way that a free end part of the tool electrode forms a machining electrode face, at a spacing opposite the workpiece, and a machining gap, flushed with a machining fluid, is defined between the electrode face and the workpiece,
   applying an erosive machining current between the tool electrode and the workpiece in order to remove material electroerosively from the workpiece,
   threading the tool electrode, between the tool head and the free end part, through a tool electrode guide thereby defining a deflecting part of the tool electrode within the electrode guide, and
   to optimize the machining gap, deflecting the deflecting part of the tool electrode in the electrode guide in a direction transverse to an axis of the tool electrode by a deflecting force of an external magnetic field, thereby producing an axial motion of the free end part, wherein the deflecting force is proportionally dependent on the erosive machining current when the magnetic field is kept constant.

2. The method of claim 1, further comprising the step of exposing the tool electrode between the tool head and the free end part to the action of a magnetic field which causes a deflection of the tool electrode that is supplied with erosive machining current.

3. The method of claim 1, further comprising the steps of coarse regulation of the machining gap with the aid of the electrode feed drive device in the tool head, and fine regulation by means of the deflection of the tool electrode.

4. The method of claim 2, further comprising the steps of coarse regulation of the machining gap with the aid of the electrode feed drive device in the tool head, and fine regulation by means of the deflection of the tool electrode.

5. The method of claim 1, wherein the tool electrode is held by positive engagement with the electrode feed drive device and threaded into the tool electrode guide.

6. An apparatus for electroerosive material machining of a workpiece with an elongated, elastically deformable tool electrode, the apparatus comprising,
   a tool head for holding the tool electrode, whereby for the tool electrode a free end part forming a machining electrode face is placed at a spacing opposite the workpiece, and a machining gap flushed with a machining fluid is defined,
   a current supplying device for applying an erosive machining current between the tool electrode and the workpiece for electroerosive removal of material from the workpiece, and
   an electromagnetic converter means for directly converting the erosive machining current into a corresponding axial motion of the free end part of the tool electrode, for deflecting a deflecting part of the tool electrode in a direction transverse to an axis of the tool electrode by a deflecting force of an external magnetic field; thereby maintaining the optimal machining gap in the erosion process, and for keeping the magnetic field constant to cause the deflecting force to be proportionally dependent on the erosive machining current.

7. The apparatus of claim 6, wherein the electromagnetic converter comprises a magnet between whose poles a tool electrode is located, and an electrode guide.

8. The apparatus of claim 6, wherein the electrode guide is a tube that extends between the tool head and the workpiece, and wherein on opposed sides of the electrode guide there is an air gap, which in the middle has an oval void and on the a sliding passage for the tool electrode on the end of the electrode guide toward the workpiece.

9. The apparatus of claim 7, wherein the electrode guide is a tube that extends between the tool head and the workpiece, and wherein on opposed sides of the electrode guide there is an air gap, which in the middle has an oval void and on the a sliding passage for the tool electrode on the end of the electrode guide toward the workpiece.

10. The apparatus of claim 6, wherein the poles of the magnet are accommodated on the electrode guide, in the region of the oval void.

11. The apparatus of claim 7, wherein the poles of the magnet are accommodated on the electrode guide, in the region of the oval void.

* * * * *

UNITED STATES PATENT AND TRADEMARK OFFICE
CERTIFICATE OF CORRECTION

PATENT NO.        : 7,594,987 B2                              Page 1 of 1
APPLICATION NO. : 10/495337
DATED             : September 29, 2009
INVENTOR(S)       : Boris Lukic It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Twenty-eighth Day of September, 2010

David J. Kappos
*Director of the United States Patent and Trademark Office*